United States Patent Office 3,038,897
Patented June 12, 1962

3,038,897
3-BASIC ETHERS OF 17-ALKYLANDROSTENES
Paul L. Tiernan, Hamilton, Ohio, assignor to Richardson-Merrell Inc., New York, N.Y., a corporation of Delaware
No Drawing. Filed Jan. 23, 1961, Ser. No. 83,866
14 Claims. (Cl. 260—239.5)

This invention relates to new and useful chemical compounds and to processes of preparing the new chemical compounds to be described.

The novel compounds of the present invention may be represented by the following general formula:

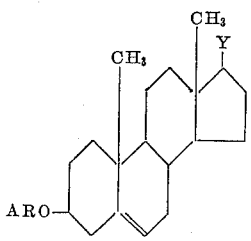

where A is a basic group selected from di(hydroxy lower alkyl)amino, di(halo lower alkyl)amino, or a N-heterocyclic group such as piperidino, morpholino, thiamorpholino, pyrrolidino, N-methylpiperazino, N-(2-hydroxyethyl)piperazino, N-(2-haloethyl)piperazino, phthalimido, isoindolino, N-(2-acetoxyethyl)piperazino, R is lower alkylene, hydroxy lower alkylene and acyloxy lower alkylene, and Y is an alkyl or alkylenyl group of 8 to 10 carbon atoms.

The compounds of the invention are basic and may be used in the form of their free bases, acid addition salts, and quaternary ammonium salts. The acid addition salts include the hydrochloride, hydrobromide, thymolsulfonate, maleate, succinate, citrate, and other pharmaceutically acceptable salts. The quaternary ammonium salts include the methiodide, ethiodide, methobromide, methosulfate, and other pharmaceutically suitable quaternaries.

The novel compounds of this invention can be prepared by the following sequence of reactions.

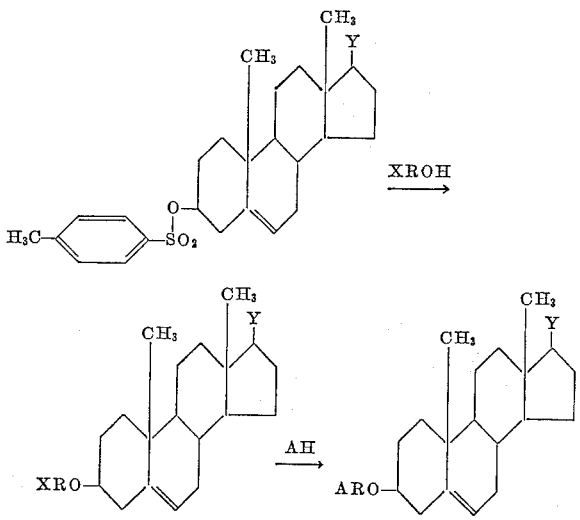

where R and Y are the same as above, X is a halogen, and A is the same as above. Alternately, the tosyl ester can be etherified with an aminoalkanol of the formula AROH to give the desired product.

The starting tosyl esters can be prepared according to the method of Wallis et al., J. Am. Chem. Soc. 59, 137 (1937). The reaction of the tosyl ester with the haloalkanol (which is also the solvent) is carried out in the presence of an equimolar amount of pyridine. The amination can be carried out by refluxing the haloalkyl ether with a suitable amine in an inert solvent.

Where A is di(haloalkyl)amino or N-(2-chloroethyl)-piperazino, the final product may be obtained by halogenating with a suitable agent, such as, for example, a phosphorus oxyhalide or thionyl halide, the product wherein A is di(hydroxyalkyl)amino or N-(2-hydroxyethyl)piperazino.

A preferred process of preparing those compounds wherein R is hydroxy lower alkyl involves reacting the desired 3-hydroxy sterol with an epihalohydrin in the presence of a catalyst such as anhydrous stannic chloride and thereafter treating the product with an amine. Examples XIII and XXI illustrate this procedure. Compounds in which the R group is acyloxyalkyl may be prepared from their hydroxyalkyl derivatives as is shown in the examples.

The compounds of the above general formula have useful anti-inflammatory activity and as such are useful in the reduction of inflammation and edema and thus may find application in the treatment of rheumatoid arthritis, gouty arthritis, neuralgia, bursitis, dermatosis, and conjunctivitis. The average daily dose may vary from 100 mg. to about 4 grams per day when administered by the oral route, and from about 10 mg. to 1 g. per day when administered parenterally. These compounds may be administered topically in 0.10% to 10% ointments or lotions.

Some of the compounds having the above general structure also possess other useful physiological properties, such as depressing the cholesterol level in blood and reducing the clotting time in blood.

The novel compounds of our invention will be further illustrated by the following examples.

EXAMPLE I

*3β-[β-(Bis{β-Hydroxyethyl}Amino)Ethoxy]Δ⁵-Cholestene Hydrochloride*

A solution of 37.4 g. (0.07 mole) of cholesterol tosylate, 130 ml. of ethylene chlorohydrin and 13 g. of dry pyridine was heated on a steam bath overnight. The mixture was poured into cold water, then extracted with ether. The combined ether extracts were washed with water, dried with anhydrous magnesium sulfate, filtered and the ether evaporated. The colorless oil was dissolved in 250 ml. butanone and methanol was added until the solution became slightly turbid. The solution was chilled overnight at —20° C. The waxy solid which separated was filtered and dried in the air to give 18 g., M.P. 89–91° C. Recrystallization from 1 liter of 95 percent ethanol gave 12.5 g., M.P. 89–91° C. Concentration of the filtrate gave a second crop (5.2 g.), M.P. 89–91° C. The total of 17.7 g. represented a 57 percent yield of 3β-(β-chloroethoxy)-Δ⁵-cholestene.

A solution of 21 g. (0.046 mole) 3β-(β-chlorethoxy)-Δ⁵-cholestene, 20 g. (0.19 mole) of bis-(β-hydroxyethyl)-amine and 150 ml. of isoamyl alcohol was heated to reflux for 24 hours. The solvent was removed by distillation under reduced pressure and the residue dissolved in ether. The ether solution was washed well with water, dried over anhydrous magnesium sulfate, then filtered. The dry ether solution was concentrated to one-half the original volume and made acid with alcoholic hydrogen chloride. The white solid which precipitated was filtered and dried. This material (15 g.) was recrystallized from a mixture of butanone and methanol to give 11.5 g. of 3β - [β - (bis{β - hydroxyethyl}amino)ethoxy] - Δ⁵ - cholestene hydrochloride, M.P. 177–180° C.

EXAMPLE II

*3β-[β-(Bis{β-Chloroethyl}Amino)Ethoxy]-Δ⁵-Cholestene Hydrochloride*

A mixture of 10 g. (0.018 mole) of the bis-hydroxyethylamino ether prepared as in Example 1, 5.5 g. (0.036 mole) phosphorus oxychloride and 200 ml. dry benzene was heated to refluxing for about one hour until a homogeneous solution was obtained. The cooled reaction mixture was washed with 10% aqueous KOH solution, then with water. The benzene was distilled under reduced pressure and the residual oil was taken up in anhydrous ether. The ether solution was made acidic by the addition of alcoholic hydrochloric acid. The hydrochloride salt of the product was collected and recrystallized from a mixture of methanol and butanone to give 6.5 g. of white needles, M.P. 180–181° C.

EXAMPLE III

*3β-(β-Piperidinoethoxy)-Δ⁵-Cholestene Hydrochloride Hemihydrate*

A solution of 6.1 g. (0.0135 mole) of 3β-(β-chloroethoxy)-Δ⁵-cholestene (prepared as given under Example 1), and 2.3 g. (0.027 mole) of piperidine in 50 ml. of isoamyl alcohol was heated to reflux for 18 hours. The solvent was removed by distillation under reduced pressure and the residue treated with water and extracted with ether. The combined ether extracts were washed with water, then dried over anhydrous magnesium sulfate and filtered. The ether solution was acidified with alcoholic hydrogen chloride. The crude hydrochloride salt was filtered and dried and weighed 6.2 g. This crude material was recrystallized from a mixture of butanone and methanol to give 5.0 g. of 3β-(β-piperidinoethoxy)-Δ⁵-cholestene hydrochloride hemihydrate, M.P. 220–221° C.

The hydrochloride was converted to the free base by treating it with 10% sodium hydroxide solution. The base was recrystallized from a mixture of methanol and butanone to give needles, melting at 98–100° C., analyzing as a hemihydrate.

The citrate salt was prepared by mixing equivalent amounts of the base and citric acid in butanone. Cooling the solution caused precipitation of the citrate salt, which was recrystallized from a mixture of methanol and butanone to give crystals of the citrate salt of 3β-(β-piperidinoethoxy)-Δ⁵-cholestene, melting at 145–149° C. with decomposition.

EXAMPLE IV

*3β-(β-Morpholinoethoxy)-Δ⁵-Cholestene Hydrochloride*

A solution of 6.1 g. (0.0135 mole) of 3β-(β-chloroethoxy)-Δ⁵-cholestene and 2.24 g. (0.027 mole) morpholine in 50 ml. of isoamyl alcohol was heated to reflux for 18 hours. The solvent was removed by distillation under reduced pressure and the residue taken up in water. The aqueous mixture was thoroughly extracted with ether and the combined ether extracts washed once with water. The ethereal solution was dried over anhydrous magnesium sulfate and filtered, then made acid by the addition of alcoholic hydrogen chloride. The white solid which precipitated was filtered and dried. This crude material (5.6 g.) was recrystallized from methanol to give 4.8 g. of 3β-(β-morpholinoethoxy)-Δ⁵-cholestene hydrochloride, M.P. 215–217° C. (decomp.).

EXAMPLE V

*3β-[β-(4-{β-Hydroxyethyl}Piperazino)Ethoxy]-Δ⁵-Cholestene Citrate*

A solution of 8.6 g. (0.019 mole) of 3β-(β-chloroethoxy)-Δ⁵-cholestene and 2.95 g. (0.038 mole) of 1-(β-hydroxyethyl)piperazine in 50 ml. isoamyl alcohol was heated to reflux for 24 hours. The solvent was removed under reduced pressure and the residue was dissolved in ether and filtered from the by-product hydrochloride of 1-(β-hydroxyethyl)piperazine. The ether filtrate was then evaporated, leaving 4.56 g. of the crude base. This product was dissolved in butanone and added to a solution of 1.6 g. of citric acid in a mixture of ethanol and butanone. Upon standing, crystals of the salt were deposited, which were collected and recrystallized from a mixture of methanol and butanone to give 3.2 g. of the dihydrogen citrate salt of 3β-[β-(4-{β-hydroxyethyl}-piperazino)ethoxy]-Δ⁵-cholestene, melting at 170–172° C. (with decomposition), which analyzed as the trihydrate.

EXAMPLE VI

*3β-[β-(Bis-{β-Hydroxyethyl}Amino)Ethoxy]-Δ⁵-Stigmastene Hydrochloride*

(Y=—CH(CH₃)—(CH₂)₂—CH(C₂H₅)—CH(CH₃)₂)

β-Sitosterol tosylate was prepared by the method described for cholesterol tosylate under Example 1 above, i.e., the method E. S. Wallis et. al., J. Am. Chem. Soc., 59, 137–140 (1937), employed for preparing cholesterol tosylate. The samples of β-sitosterol used came from both tall oil and cotton seed oil. β-Sitosterol tosylate, recrystallized from acetone, had a melting point of 135–136° C.

A solution of 46 g. (0.079 mole) of β-sitosterol tosylate, 100 ml. of ethylene chlorohydrin and 6.2 g. (0.079 mole) of dry pyridine was heated on a steam bath for about two hours, during which time two immiscible layers separated. When the mixture cooled, the colorless upper layer solidified. The solid was separated by filtration and recrystallized from a mixture of ether and methanol (it was quite soluble in ether, insoluble in methanol) at 0° C. The white crystalline precipitate obtained weighed 17.7 g. and melted at 72–73° C. A second crop of 6 g., M.P. 65–67° C., was obtained from the filtrate. This was recrystallized to give 5 g., M.P. 72–73° C. The total of 22.7 g. represented a 60 percent yield of 3β-(β-chloroethoxy)-Δ⁵-stigmastene.

A solution of 17 g. (0.036 mole) of 3β-(β-chloroethoxy)-Δ⁵-stigmastene and 8 g. (0.072 mole of bis-(β-hydroxyethyl)amine in 100 ml. of isoamyl alcohol was heated to reflux for 18 hours. The solvent was removed by distillation under reduced pressure. The residue was poured into ice water. The white, waxy solid was extracted with ether. The combined ether extracts were washed once with water. The ether was evaporated and replaced with benzene. The benzene was finally removed by distillation under reduced pressure. The residue was dissolved in anhydrous ether (the base could be crystallized from ether at −20° C.; it had a melting point of 150–152° C.). The ether solution was acidified with alcoholic hydrogen chloride. The hydrochloride salt was filtered and dried, M.P. 165–170° C. (decomp.). This crude material (16.5 g.) was recrystallized from a mixture of butanone and methanol to give 12.2 g. of 3β - [β-(bis{β-hydroxyethyl}amino)-ethoxy]-Δ⁵-stigmastene hydrochloride, M.P. 167–169° C. (decomp.).

EXAMPLE VII

*3β-(β-Piperidinoethoxy)-Δ⁵-Stigmastene Hydrochloride*

A solution of 9.0 g. (0.0188 mole) of 3β-(2-chloroethoxy)-Δ⁵-stigmastene and 4.8 g. (0.0564 mole) of piperidine in 50 ml. of isoamyl alcohol was refluxed for 24 hours. The solvent was removed by distillation under reduced pressure and the residue taken up in water. The aqueous mixture was extracted thorough with ether. The ether extracts were combined and washed once with water then dried over anhydrous magnesium sulfate and filtered. The ether filtrate was made acid by the addition of alcoholic hydrogen chloride. The white solid which precipitated was filtered and dried. Recrystallization of this crude material (8.0 g.) from a mixture of butanone and methanol gave 5.0 g. of 3β-(β-piperidinoethoxy)-Δ⁵-stigmastene hydrochloride, M.P. 223–225° C. This material analyzed as the monohydrate.

EXAMPLE VIII

*3β-(β-Piperidinoethoxy)-Δ⁵-Stigmastene Methiodide*

A solution of 3 g. (0.057 mole) of 3β-(β-piperidinoethoxy)-Δ⁵-stigmastene, prepared as in Example 7, and 0.88 g. (0.062 mole) methyl iodide in 200 ml. benzene was sealed in a pressure bottle and heated at about 55° C. for three days. The crystals which separated from the cooled solution were collected and recrystallized from butanone to give 2.2 g. of 3β-(β-piperidinoethoxy)-Δ⁵-stigmastene methiodide, melting at 258–260° C. (with decomposition).

EXAMPLE IX

*3β-(β-Morpholinoethoxy)-Δ⁵-Stigmastene Hydrochloride*

A solution of 10 g. (0.021 mole) of 3β-(β-chloroethoxy)-Δ⁵-stigmastene and 3.65 g. (0.042 mole) of morpholine in 50 ml. isoamyl alcohol was heated to reflux for 24 hours. The solvent was removed by distillation under reduced pressure and the residue was taken up in water. This aqueous mixture was thoroughly extracted with ether and the extracts combined and washed once with water. The ethereal solution was dried over anhydrous magnesium sulfate and filtered. The filtrate was made acid by the addition of alcoholic hydrogen chloride. The white solid which precipitated was filtered and dried. This crude material (7.1 g.) was recrystallized from a mixture of butanone and methanol to give 5.6 g. of 3β-(β-morpholinoethoxy)-Δ⁵-stigmastene hydrochloride, M.P. 219–221° C. This material analyzed as the monohydrate.

EXAMPLE X

*3β-[β-(4-{β-Hydroxyethyl}Piperazino)-Ethoxy]-Δ⁵-Stigmastene Dihydrochloride*

A solution of 8 g. (0.017 mole) of 3β-(β-chloroethoxy)-Δ⁵-stigmastene and 4.5 g. (0.034 mole) of 1-(β-hydroxyethyl)piperazine in 50 ml. of isoamyl alcohol was heated to reflux for 24 hours. The solvent was removed by distillation under reduced pressure and the residue dissolved in anhydrous ether. The precipitate which separated was removed by filtration (this was the hydrochloride salt of hydroxyethylpiperazine). The ether filtrate was made acid by the addition of alcoholic hydrogen chloride. The white solid which precipitated was filtered and dried. It proved to be insoluble in water, alcohols, acetone, butanone, ethyl acetate, etc. It was heated to reflux with 500 ml. of methanol, cooled and filtered to give 9 g. of the desired dihydrochloride, M.P. 235–240° C. (decomposition).

The dihydrochloride was converted to the free base by treating a warm aqueous suspension of it with 10% sodium hydroxide solution. The base was recrystallized from a mixture of methanol and butanone to give crystals, M.P. 90–92° C., which analyzed as the monohydrate of 3β-[β-(4-{β - hydroxyethyl}piperazino)ethoxy] - Δ⁵ - stigmastene.

This base was converted to the dihydrogen citrate salt by adding a solution of 8.5 g. (0.015 mole) of the base dissolved in butanone to a solution of 2.88 g. (0.015 mole) citric acid in methanol and butanone. The salt which separated on cooling was collected and recrystallized from aqueous butanone, to give 6.8 g. of the dihydrogen citrate salt of 3β-[β-(4-{β-hydroxyethyl}-piperazino)ethoxy]-Δ⁵-stigmastene, M.P. 130° C. (with decomposition). The product as obtained by this procedure analyzes as a monohydrate, which could be dried under high vacuum to the anhydrous form.

EXAMPLE XI

*3β-(β-Phthalimidoethoxy)-Δ⁵-Stigmastene*

A mixture of 5.0 g. (0.0105 mole) of 3β-(β-chloroethoxy)-Δ⁵-stigmastene, 1.98 g. (0.0105 mole) of potassium phthalimide and 75 ml. of dimethylformamide was heated on the steam bath with stirring for 18 hours. The precipitate which separated on cooling was filtered and the filter cake washed with water. The crude product was dissolved in chloroform and methanol added until a faint cloudiness persisted. On standing at 5° C. overnight crystals were deposited which were collected and air dried to give 4.3 g. of 3β-(β-phthalimidoethoxy)-Δ⁵-stigmastene, melting at 170–172° C.

EXAMPLE XII

*3β-(β-2-Isoindolinoethoxy)-Δ⁵-Stigmastene Hydrochloride*

A solution of 10.0 g. (0.017 mole) of 3β-(β-phthalimidoethoxy)-Δ⁵-stigmastene in 150 ml. of benzene was dried azeotropically by distillation of 50 ml. of benzene. This solution was added (after cooling to room temperature) to 1.1 g. (0.029 mole) of lithium aluminum hydride in 165 ml. of anhydrous ether over a period of 45 minutes. The mixture was refluxed for 2½ hours and finally the excess LiAlH₄ was decomposed in the usual way with ethyl acetate. After final treatment with aqueous ether the mixture was filtered and the colorless filtrate evaporated to dryness under reduced pressure. The pale yellow oil remaining (10.6 g.) was dissolved in 100 ml. of butanone and treated with 1.7 ml. of 37% hydrochloric acid. The solution immediately became dark and the precipitate deposited was, after filtering, nearly black. Repeated recrystallization and decolorization with "Norit" gave 3.8 g. of 3β-(β-isoindolinoethoxy)-Δ⁵-stigmastene hydrochloride, melting at 230–231° C.

EXAMPLE XIII

*3β-(2-Hydroxy-3-Piperidino-1-Propoxy)-Δ⁵-Stigmastene Hydrochloride*

A solution of 20 g. (0.049 mole) 3β-hydroxy-Δ⁵-stigmastene and 9.9 g. (0.049 mole) epibromohydrin in 150 ml. of dry benzene was chilled to between 0° and 5° C. To this chilled solution was added, in one portion, 0.3 ml. of SnCl₄ in 5 ml. of dry benzene. The solution was refluxed for 15 minutes and allowed to stand at room temperature overnight. At the end of this period the solvent was removed under reduced pressure and the residue was taken up in ether. This solution was washed with two 100 ml. portions of saturated sodium bicarbonate solution then two 100 ml. portions of water. The solution was dried over anhydrous magnesium sulfate and the ether removed by evaporation, first at atmospheric pressure and finally under reduced pressure. The residue, which is the crude 3β-(3-bromo-2-hydroxy-1-propoxy)-Δ⁵-stigmastene, weighed 28.2 g. This material was not purified further but was treated with 8.4 g. (0.098 mole) of dry piperidine in dry benzene and refluxed overnight. The piperidine hydrobromide which separated was filtered off and the filtrate washed with saturated salt solution. The benzene was evaporated under reduced pressure and the residue taken up in ether and dried over anhydrous magnesium sulfate, filtered and made acid to Congo red paper with alcoholic hydrogen chloride. The crude salt which precipitated was recrystallized from a mixture of methanol and butanone to give 12.2 g. of 3β-(2-hydroxy-3-piperidino-1-propoxy)-Δ⁵-stigmastene hydrochloride as the sesquihydrate, melting at 235–237° C. with decomposition.

EXAMPLE XIV

*3β-(2-Acetoxy-3-Piperidino-1-Propoxy)-Δ⁵-Stigmastene Hydrochloride*

3β-(2-hydroxy-3-piperidino-1-propoxy)-Δ⁵-stigmastene (6.5 g., 0.011 mole), prepared as described in Example XIII, was dissolved in 75 ml. of dry pyridine and 25 ml. of acetic anhydride was added. After standing at room temperature overnight the solution was poured into 500 ml. of water and the resulting solution was thoroughly extracted with ether. The combined ether extracts were washed with several portions of water, then dried over anhydrous magnesium sulfate. Treatment with alcoholic hydrogen chloride gave the crude salt which on recrystallization from a mixture of methanol and butanone yielded 1.8 g. of 3β-(2-acetoxy-3-piperidino-1-propoxy)-Δ⁵-stigmastene hydrochloride, melting between 225° and 230° C., with decomposition.

EXAMPLE XV

*3β-(2-Propionoxy-3-Piperidino-1-Propoxy)-Δ⁵-Stigmastene Hydrochloride*

From 5.0 g. of 3β-(2-hydroxy-3-piperidino-1-propoxy)-Δ⁵-stigmastene and 25 ml. propionic anhydride in 75 ml. of dry pyridine, as in the procedure of Example XIV, there was obtained 2.5 g. of 3β-(2-propionoxy-3-piperidino-1-propoxy)-Δ⁵-stigmastene hydrochloride, melting between 220-225° C., with decomposition.

EXAMPLE XVI

*3β-[3-Piperidino-2-(3,4,5-Trimethoxybenzoyloxy)-1-Propoxy]-Δ⁵-Stigmastene Hydrochloride*

Similarly, 4.2 g. (0.0075 mole) of 3β-(2-hydroxy-3-piperidino-1-propoxy)-Δ⁵-Stigmastene and 1.8 g. (0.0078 mole) of 3,4,5-trimethoxybenzoyl chloride in 100 ml. of dry benzene, refluxed overnight, gave 3.1 g. of 3β-[3-piperidino-2-(3,4,5-trimethoxybenzoyloxy)-1-propoxy]-Δ⁵-stigmastene hydrochloride, M.P. 205–210° C. (decomp.) after two recrystallizations from butanone-ether mixtures.

EXAMPLE XVII

*3β-[3-(4-β-Hydroxyethylpiperazino)-2-Hydroxy-1-Propoxy]-Δ⁵-Stigmastene Dihydrochloride*

This compound was prepared, using the procedure of Example XIII, from 14 g. (0.025 mole) of crude 3β-(2-hydroxy-3-bromo-1-propoxy)-Δ⁵-stigmastene and 6.5 g. (0.05 mole) of 1-(β-hydroxyethyl)piperazine. There was obtained 4.5 g. of 3β-[3-(4-β-hydroxyethylpiperazino)-2-hydroxy-1-propoxy]-Δ⁵-stigmastene dihydrochloride, as the hemihydrate, M.P. 245–247° C. (decomposition).

EXAMPLE XVIII

*3β-[3-(4-β-Acetoxyethylpiperazino)-2-Acetoxy-1-Propoxy]-Δ⁵-Stigmastene Dihydrochloride*

From 2.5 g. (0.0037 mole) of 3β-[3-(4-β-hydroxyethylpiperazino)-2-hydroxy-1-propoxy]-Δ⁵-stigmastene dihydrochloride and 25 ml. of acetic anhydride in 100 ml. of dry pyridine, using the procedure of Example XIV, there was obtained the crude diacetate which was treated, in ether, with alcoholic HCl, to give 1.97 g. of 3β-[3-(4-β-acetoxyethylpiperazino)-2-acetoxy-1-propoxy]-Δ⁵-stigmastene dihydrochloride, as the hemihydrate, M.P. 240° C. (decomposition).

EXAMPLE XIX

*3β-(2-Hydroxy-3-Pyrrolidino-1-Propoxy)-Δ⁵-Stigmastene Hydrochloride*

A solution of 14.0 g. (0.025 mole) of 3β-(2-hydroxy-3-bromo-1-propoxy)-Δ⁵-stigmastene and 3.5 g. (0.05 mole) pyrrolidine in dry benzene was heated to reflux for 6 hours. Working up as described in Example XIII gave 2.5 g. of 3β-(2-hydroxy-3-pyrrolidino-1-propoxy)-Δ⁵-Stigmastene hydrochloride, as the monohydrate, M.P. 215–220° C. (decomposition).

EXAMPLE XX

*3β-(β-Piperidinoethoxy)-Δ⁵,²²-Stigmastadiene Hydrochloride*

A mixture of 23.8 g. (0.04 mole) of Δ⁵,²²-stigmastadiene-3β-p-toluensulfonate, [prepared according to the method of Wallis et al., J. Am. Chem. Soc. 59, 137 (1937)], 250 ml. of ethylene chlorohydrin and 3.2 g. (0.04 mole) of dry pyridine was heated on the steam bath for 4 hours. Working up as described in Example VI gave 10 g. of 3β-(β-chloroethoxy)-Δ⁵,²²-stigmastadiene, M. P. 102–103° C. This intermediate (0.021 mole) was heated to reflux in isoamyl alcohol containing 7.2 g. (0.084 mole) of piperidine for 18 hours. Upon working up the reaction mixture as described in Example VII, 8.2 g. of 3β-(β-piperidinoethoxy)-Δ⁵,²²-stigmastadiene hydrochloride, as the hemihydrate, M.P. 227–230° C. (decomposition) was obtained.

EXAMPLE XXI

*3β-(2-Hydroxy-3-Piperidino-1-Propoxy)-Δ⁵,²²-Stigmastadiene Hydrochloride*

This compound was prepared as described in Example XIII; from 20 g. (0.049 mole) Δ⁵,²²-stigmastadiene-3β-ol, 6.8 g. (0.049 mole) epibromohydrin, and 0.3 ml. stannic chloride in dry benzene was obtained 28.5 g. of the crude 3β-(2-hydroxy-3-bromo-1-propoxy)-Δ⁵,²²-stigmastadiene. This (0.05 mole) was heated to reflux in dry benzene containing 8.5 g. (0.1 mole) of piperidine. Working up as described in Example XIII, gave 8.5 g. of 3β-(2-hydroxy-3-piperidino-1-propoxy)-Δ⁵,²² - stigmastadiene hydrochloride, as the monohydrate, M.P. 218–220° C. (decomposition).

EXAMPLE XXII

*3β-(2-Hydroxy-3-Piperidino-1-Propoxy)-Δ⁵-Cholestene Hydrochloride*

A solution of 5 g. (0.013 mole) of chloesterol, 1.7 g. (0.013 mole) epibromohydrin and 0.3 ml. concentrated sulfuric acid was heated to refluxing for 18 hours. The benzene was evaporated under reduced pressure and the residue was dissolved in ether and washed with water. Most of the ether was removed and replaced by ethyl alcohol and the resulting solution was cooled overnight at −20° C. A white crystalline solid, 0.6 g., was collected and found to be bicholesteryl ether, M.P. 195–197° C. The filtrate was evaporated under vacuum to give 2.8 g. of solid residue, assumed to be essentially the desired 3β-(3-bromo-2-hydroxy-1-propoxy)-Δ⁵-cholestene. This residue, dissolved in dry benzene, was treated with 0.94 g. piperidine and the solution refluxed for one hour. Proceeding as in Example XIII, there was obtained 2.4 g. of 3β-(2-hydroxy-3-piperidino-1-propoxy)-Δ⁵-cholestene hydrochloride, M.P. 203–233° C.

A similar yield was obtained in a shorter time when anhydrous stannic chloride was substituted for sulfuric acid as the catalyst in the condensation of cholesterol with epibromohydrin.

EXAMPLE XXIII

*3β-(2-Acetoxy-3-Piperidino-1-Propoxy)-Δ⁵-Cholestene Hydrochloride*

Using the procedure of Example XIV, 5.0 g. (0.091 mole) of 3β-(2-hydroxy-3-piperidino-1-propoxy)-Δ⁵-cholestene hydrochloride and 25 ml. of acetic anhydride in 100 ml. of dry pyridine gave, after treatment of the product with alcoholic HCl, 4.1 g. of 3β-(2-acetoxy-3-piperidino-1-propoxy)-Δ⁵-cholestene hydrochloride, M.P. 222–225° C. (decomposition), recrystallized from a mixture of butanone and methanol.

This application is a continuation-in-part of Serial No. 845,064, filed October 8, 1959, now abandoned.

I claim:
1. 3β - [β - (bis{β - hydroxyethyl}amino)ethoxy] - Δ⁵-cholestene.
2. 3β-(β-piperidinoethoxy)-Δ⁵-cholestene.
3. 3β-(β-piperidinoethoxy)-Δ⁵-stigmastene.
4. 3β-(β-piperidinoethoxy)-Δ⁵-stigmastene methiodide.
5. 3β - [β - (bis{β - chloroethyl}amino)ethoxy] - Δ⁵-cholestene hydrochloride.
6. 3β - [β - (4 - {β - hydroxyethyl}piperazino)ethoxy]-Δ⁵-stigmastene dihydrochloride.
7. 3β - (2 - hydroxy - 3 - piperidino - 1 - propoxy) - Δ⁵-stigmastene hydrochloride.

8. 3β - [3 - (4 - β - hydroxyethylpiperazino) - 2 - hydroxy-1-propoxy]-Δ⁵-stigmastene dihydrochloride.

9. 3β - (2 - hydroxy - 3 - pyrrolidino - 1 - propoxy)-Δ⁵-stigmastene hydrochloride.

10. 3β - (β - piperidinoethoxy) - Δ⁵,²² - stigmastadiene hydrochloride.

11. 3β - (2 - hydroxy - 3 - piperidino - 1 - propoxy)-Δ⁵,²² stigmastadiene hydrochloride.

12. 3β - (2 - hydroxy - piperidino - 1 - propoxy) - Δ⁵-cholestene hydrochloride.

13. 3β - (2 - acetoxy - 3 - piperidino - 1 - propoxy) - Δ⁵-cholestene hydrochloride.

14. Compounds of the group consisting of the basic ethers of cholesterol, stigmasterol and sitosterol in which the basic ether group has the formula:

ARO— in which A is a member of the group consisting of di(hydroxy lower alkyl)amino, di(chloro lower alkyl)amino, piperidino, morpholino, thiamorpholino, pyrrolidino, N-methylpiperazino, N-(2-hydroxyethyl)piperazino, N-(2-haloethyl)piperazino, phthalimido, isoindolino and N-(2-acetoxyethyl)piperazino and R is a member of the group consisting of —CH₂CH₂— and

—CH₂CHR'—CH₂— in which R' is a member of the group consisting of hydrogen, hydroxy, and lower acyloxy, and the acid addition and quaternary ammonium salts of said basic ethers.

No references cited.